United States Patent

Sawada et al.

[11] Patent Number: 5,715,496
[45] Date of Patent: Feb. 3, 1998

[54] REMOTE SERVICE SYSTEM FOR IMAGE FORMING APPARATUSES

[75] Inventors: Masaithi Sawada, Tokyo; Shohzou Miyawaki, Urawa, both of Japan

[73] Assignee: Ricoh Company, Ltd., Tokyo, Japan

[21] Appl. No.: 588,305

[22] Filed: Jan. 18, 1996

[30] Foreign Application Priority Data

Jan. 19, 1995 [JP] Japan ................. 7-006612

[51] Int. Cl.⁶ ............................. G03G 21/00
[52] U.S. Cl. ................... 399/8; 399/9; 399/10
[58] Field of Search ................ 355/206, 205, 355/207; 395/184.01; 364/943.9; 399/21, 10, 8, 9

[56] References Cited

U.S. PATENT DOCUMENTS

| | | |
|---|---|---|
| 4,491,929 | 1/1985 | Ikoma et al. ............... 364/563 |
| 4,583,834 | 4/1986 | Seko et al. . |
| 4,804,998 | 2/1989 | Miyawaki . |
| 4,999,672 | 3/1991 | Rice et al. ................. 355/202 |
| 5,012,280 | 4/1991 | Tsutsumi et al. ........... 355/206 |
| 5,029,833 | 7/1991 | Tani et al. ................. 271/9 |
| 5,084,875 | 1/1992 | Weinberger et al. ........ 355/205 X |
| 5,131,079 | 7/1992 | Miyawaki et al. .......... 395/118 |
| 5,164,769 | 11/1992 | Hashimoto et al. ......... 355/202 |
| 5,214,772 | 5/1993 | Weinberger et al. ........ 355/205 X |
| 5,257,069 | 10/1993 | Hirata et al. .............. 355/206 X |
| 5,325,156 | 6/1994 | Ulinski ..................... 355/209 |
| 5,333,286 | 7/1994 | Weinberger et al. ........ 395/575 |
| 5,361,265 | 11/1994 | Weinberger et al. ........ 371/29.1 |
| 5,369,471 | 11/1994 | Yamada ..................... 355/206 X |
| 5,384,622 | 1/1995 | Hirata et al. .............. 355/206 |
| 5,392,095 | 2/1995 | Siegel ...................... 355/200 |
| 5,394,458 | 2/1995 | Allen et al. ................ 379/1 |
| 5,414,494 | 5/1995 | Aikens et al. .............. 355/202 |
| 5,424,808 | 6/1995 | Maekawa et al. ........... 355/205 |
| 5,502,543 | 3/1996 | Aboujaoude ............... 355/202 |
| 5,543,892 | 8/1996 | Hirata et al. .............. 355/205 |
| 5,600,403 | 2/1997 | Inoo ........................ 399/8 |

FOREIGN PATENT DOCUMENTS 1-161960 6/1989 Japan .
3-226769 10/1991 Japan .
5-61283 3/1993 Japan .

*Primary Examiner*—R. L. Moses
*Attorney, Agent, or Firm*—Oblon, Spivak, McClelland, Maier & Neustadt, P.C.

[57] ABSTRACT

In a service system, a plurality of image forming apparatuses and a control unit for remote-controlling them are connected by a communication line. A plurality of terminal units are located at respective service stations and also connected to the control unit. The image forming apparatuses each sends, when an event indicative of or predictive of an error occurs therein, information representative of the event to the control unit. The control unit received the information analyzes it and then selectively sends information relating to maintenance or repair to the image forming apparatuses to the terminal units. The control unit has a store for sequentially storing the information received from the image forming apparatuses, an analyzer for analyzing the information stored in the store, a predictor for predicting, based on the result of analysis of the analyzer, the occurrence of an error and whether or not a serviceman's visit is necessary, and a transmitter for transmitting the result of prediction of the predictor to the service station in charge of the image forming apparatus in which an error has occurred or which needs a serviceman's visit.

28 Claims, 18 Drawing Sheets

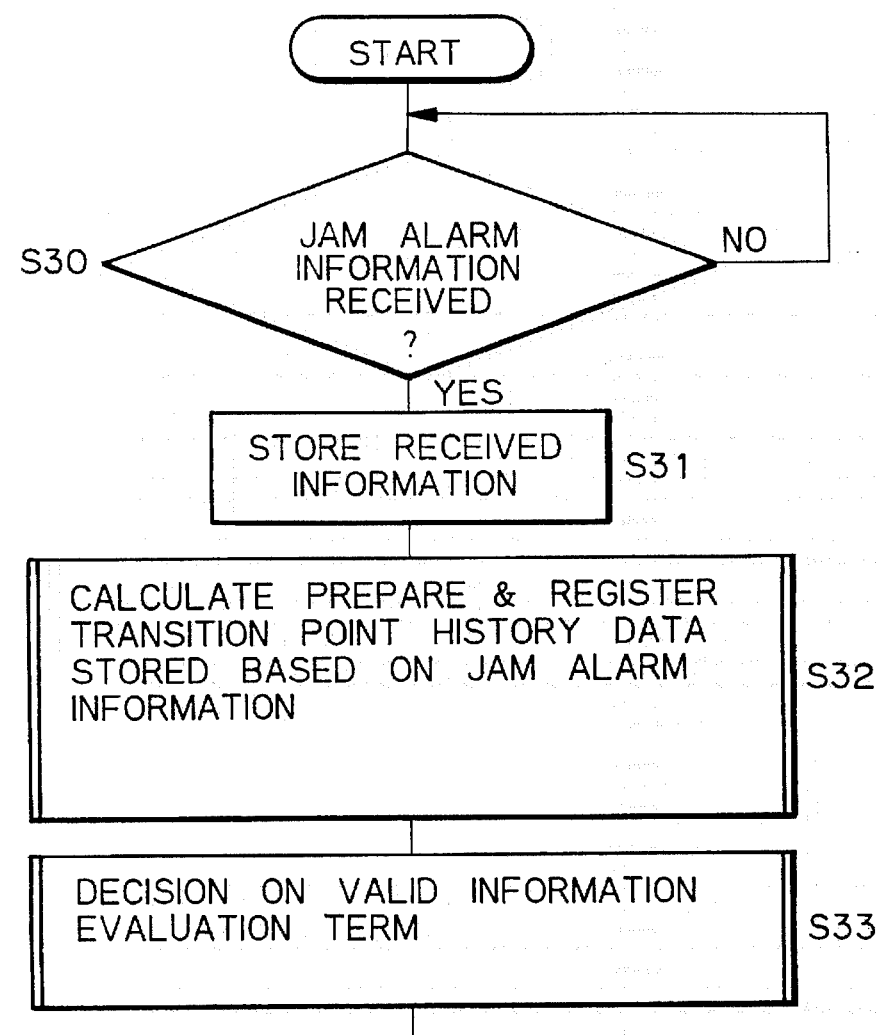

REMOTE SERVICE SYSTEM FOR IMAGE FORMING APPARATUSES

BACKGROUND OF THE INVENTION

The present invention relates to a remote service system for a number of copiers, facsimile apparatuses, printers or similar image forming apparatuses used by respective users.

Today, a great number of image forming apparatuses for forming images on papers are used in various fields. Because paper jams or similar troubles are unavoidable with this kind of apparatus, the apparatus is devised such that in the event of, e.g., a jam, the user can remove a jamming sheet and restore the apparatus to its normal condition in many circumstances. However, some kinds of jams and other troubles cannot be dealt with by the user and need a serviceman. In light of this, it is a common practice for the user and the manufacturer or distributor to make a maintenance contract, so that periodic inspection and maintenance by a serviceman so as to allow for rapid repair in the event of trouble.

Further, a number of copiers used at different locations may be connected to a single control unit or computer located at, e.g., a control center by a telephone network or similar communication line, as disclosed in, e.g., Japanese Patent Laid-Open Publication No. 3-293369 or 5-80609. When a jam or similar trouble occurs in any one of the copiers, information representative of the trouble is sent to the control unit over the communication line. Therefore, the control unit is capable of collectively controlling all the copiers at the remote station.

The control unit taught in the above Laid-Open Publication No. 3-293369 detects jams that occurred in the copier, counts the jams while classifying them by location so as to calculate the frequency of jam, and sends, when the frequency at any location exceeds an allowable value assigned to the location, alarm data to the control unit over a public telephone network, thereby informing it of the unusual number of jams. This allows the control center to see such an unusual occurrence immediately and take an adequate responsive measure, e.g., send a serviceman.

The copier taught in the above Laid-Open Publication No. 5-80609 also detects and stores, location by location, the jam or similar defective transport of a paper during the course of an image forming sequence. The copier determines the time for a data transfer based on a change in information representative of the stored transport error (frequency or the like), and then sends the information to a host computer located at a control center. The operator at the control center is capable of confirming the received information on, e.g., a display.

However, in the conventional copier and control unit described above, the copier stores the error information representative of jams or similar errors and determines the data transfer timing, while the control unit simply allows the operator to see the information received from the copier on a display or the like. Therefore, the operator must determine or predict an error on the basis of the received information, determine whether or not a visit from a serviceman is necessary, select, if it is necessary, a service station in charge of the faulty copier, and then communicate with a serviceman by telephone or facsimile machine to report information relating to the copier and its conditions to him.

Moreover, when all kinds of information relating to the copier are sent to the service station, the operator at the service station must determine whether or not the information is representative of a critical error or a simple operating condition. However, such involvement by the operator wastes time and labor as well as communication cost. Because information to be sent and available trouble shooting time are extremely limited at, e.g., the copier, as in the conventional arrangement, it would be impossible for the operator to predict an error or whether or not a serviceman's visit is necessary (remote diagnosis).

In addition, because service stations for copiers or similar image forming apparatuses each covers a particular area, it is desirable from the rapid service standpoint that a serviceman be sent from a service station closest to the place where the faulty copier is located.

SUMMARY OF THE INVENTION

It is therefore an object of the present invention to provide a remote service system for image forming apparatuses distributed over a broad area, including a number of service stations, and capable of automatically effecting the collection of service information from each apparatus, the prediction of an error, and the request for a serviceman, thereby allowing adequate preventative steps to be taken efficiently and rapidly before a critical error actually occurs.

It is another object of the present invention to provide a remote service system for image forming apparatuses and having a single control unit capable of executing highly accurate remote diagnosis, e.g., the prediction of an error and whether or not servicing by a serviceman is needed and automatically sending, if it is needed, necessary information to a service station in charge of repairing a faulty apparatus.

In accordance with the present invention, in a service system, a plurality of image forming apparatuses and a control unit for remote-controlling them are connected by a communication line. A plurality of terminal units are located at respective service stations and also connected to the control unit. The image forming apparatuses each send, when an event indicative of or predictive of an error occurs therein, information representative of the event to the control unit. The control unit receives the information, analyzes it, and then selectively sends information relating to maintenance or repair to the image forming apparatuses to the terminal units. The control unit has a storage device for sequentially storing the information received from the image forming apparatuses, an analyzer for analyzing the information stored in the storage device, a predictor for predicting, based on the result of analysis of the analyzer, the occurrence of an error and whether or not a serviceman's visit is necessary, and a transmitter for transmitting the result of prediction of the predictor to the service station in charge of the image forming apparatus in which an error has occurred or which needs a serviceman's visit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
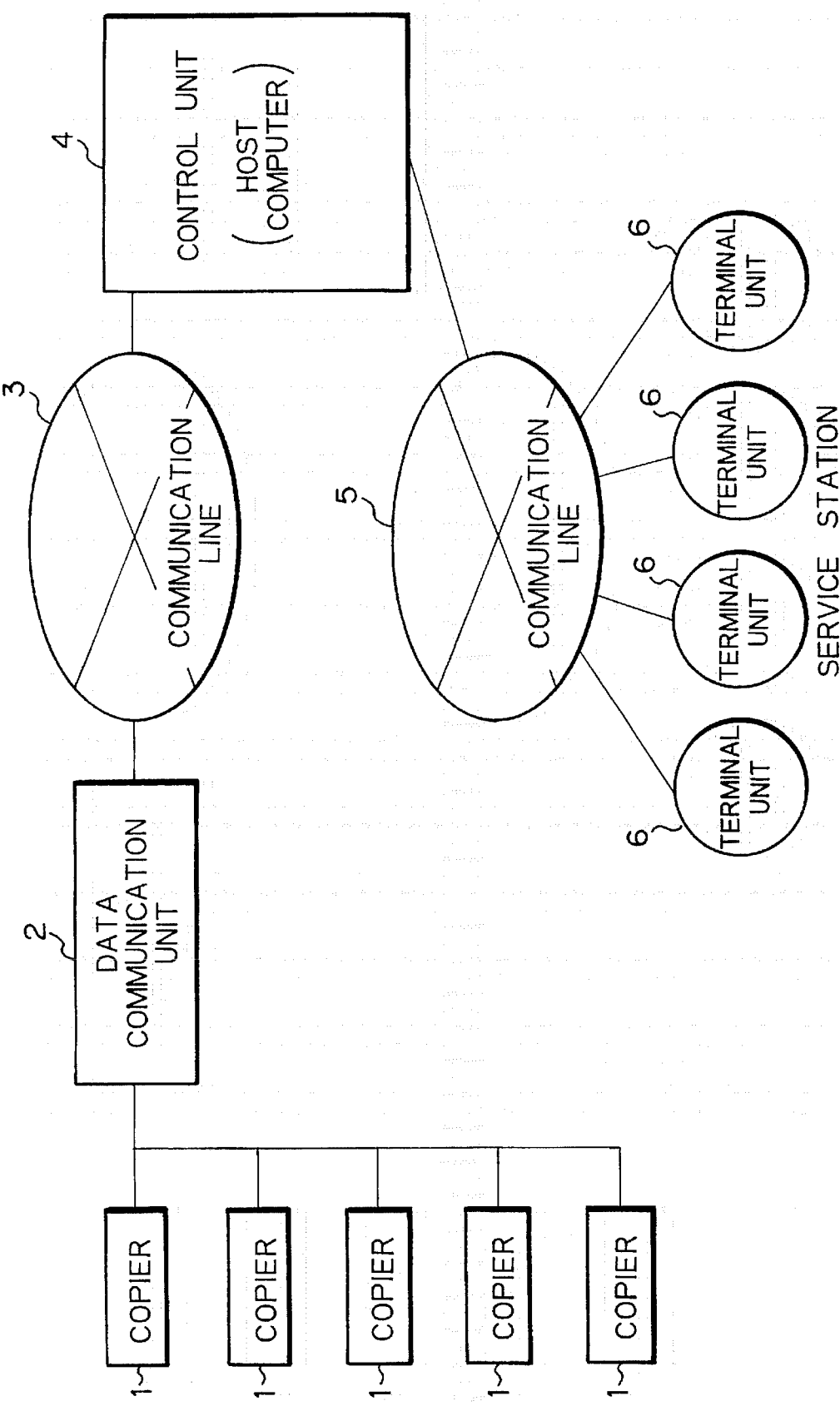
FIG. 1 is a block diagram schematically showing a remote service system for image forming apparatuses and embodying the present invention.

Referring to FIG. 1 of the drawings, a remote service system for image forming apparatuses and embodying the present invention is shown. As shown, the system includes a number of image forming apparatuses implemented as copiers 1 and located at, e.g., users' offices. The copiers 1 are connected to a single control unit or host computer 4 via a data communication unit 2 and a communication line 3. Terminal units 6 are each located at a particular service center and connected to the control unit 4 by a communication line 5. By way of example, communication lines 3 and 5 may be implemented by a public line network.

Each copier 1 has means for detecting a paper jam or similar error occurrence or an event predictive of such an error, and means for sending information representative of the error or predictive event to the control unit 4 together with necessary additional information via the communication unit 2 and line 3. The control unit 4 has means for receiving the information from the copiers 1 and storing them on a copier basis, means for analyzing the information in order to predict the occurrence of an error and whether or not a serviceman's visit is needed, and means for automatically sending, if a serviceman's visit is needed, necessary information to one of the terminal units 6 in charge of the copier 1 with the reported error. Each terminal unit 6 is implemented by a minicomputer or a personal computer and has means for storing the data received from the control unit 4, and display means for informing a serviceman of, e.g., the place to visit and the conditions of the faulty copier 1.

Figure 2:
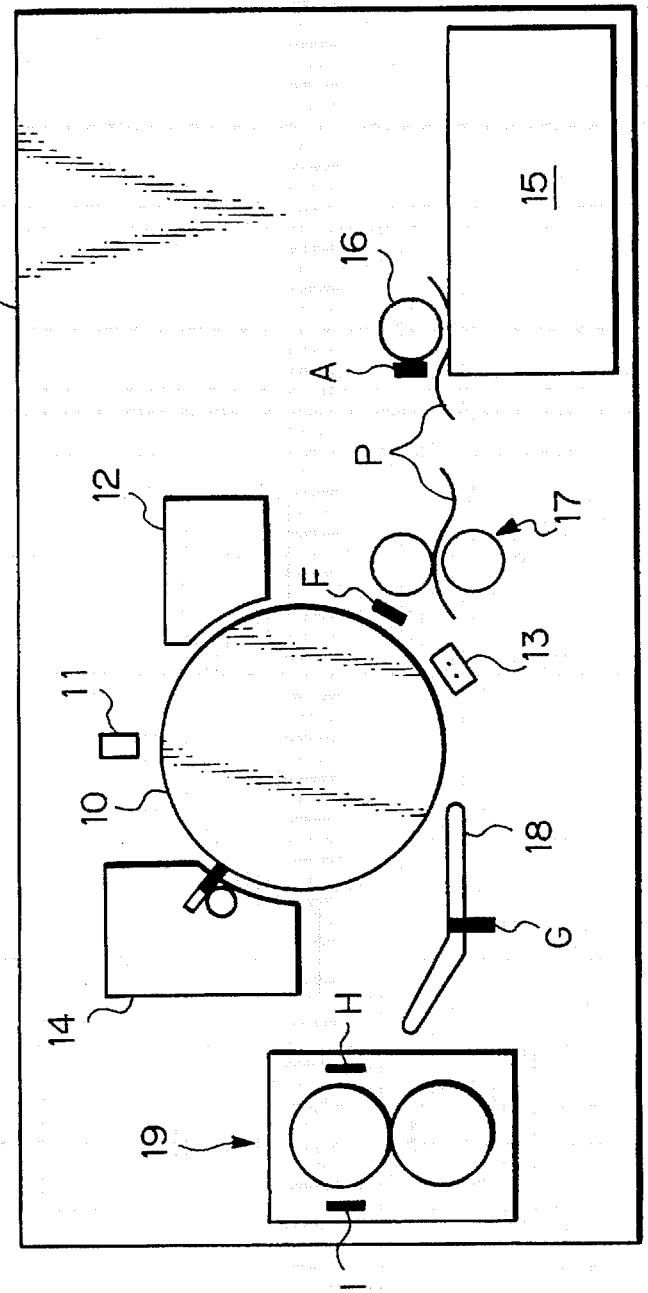
FIG. 2 shows a number of paper sensors each being located at a particular section of an image forming apparatus, implemented as a copier by way of example, or a particular position on a paper transport path.

FIG. 2 shows the sections of each copier 1 joining in image formation, and various paper sensors arranged along a paper transport path. As shown, the copier 1 has a photoconductive drum 10 at the center thereof. Arranged around the drum 10 are a main charger 11, a developing unit 12, a transfer charger 13, and a cleaning unit 14. While the drum 10 is rotated in the direction indicated by an arrow, the main charger 11 uniformly charges the surface of the drum 10. The charged surface of the drum 10 is exposed imagewise by a scanner and exposing device, not shown. As a result, a latent image representative of a document image is electrostatically formed on the drum 10. The developing unit 12 develops the latent image with a toner to thereby form a corresponding toner image.

Papers P stacked on a paper tray 15 are fed one by one toward a registration roller pair 17 by a pick-up roller 16. The roller pair 17 drives, at a preselected timing, the paper toward an image transfer position where the transfer charger 13 is located. In operation the transfer charger 13 transfers the toner image from the drum 10 to the paper P that has arrived at the image transfer position. The paper P with the toner image is conveyed to a fixing unit 19 by a conveyor belt or conveying section 19. The fixing unit 18 fixes the toner image on the paper P by heating it. Subsequently, the paper or copy P is driven out of the copier 1. After the image transfer, the surface of the drum 10 is cleaned by the cleaning unit 14 and prepared for the next charging thereby.

The paper sensors, e.g., reflection type or transmission type photosensors are sequentially arranged on the above path along which the paper P is transported in the copier 1. Specifically, there are shown in FIG. 2 a feed sensor A located at the outlet side of the pick-up roller 16, a registration sensor F located at the outlet side of the registration roller pair 17, a conveyance sensor G located at the conveying section 18, a fixation sensor H located at the inlet of the fixing unit 19, and a discharge sensor I located at the outlet of the fixing unit 19. By monitoring the output signals of the sensors A and F–I and paper transport times, it is possible to detect a transport error, i.e., paper jam and the location where it occurred. In the event of a jam, the operation of the copier 1 is interrupted while the jam is displayed on an operation and display panel, not shown. The above-described procedure is conventional.

Figure 3:
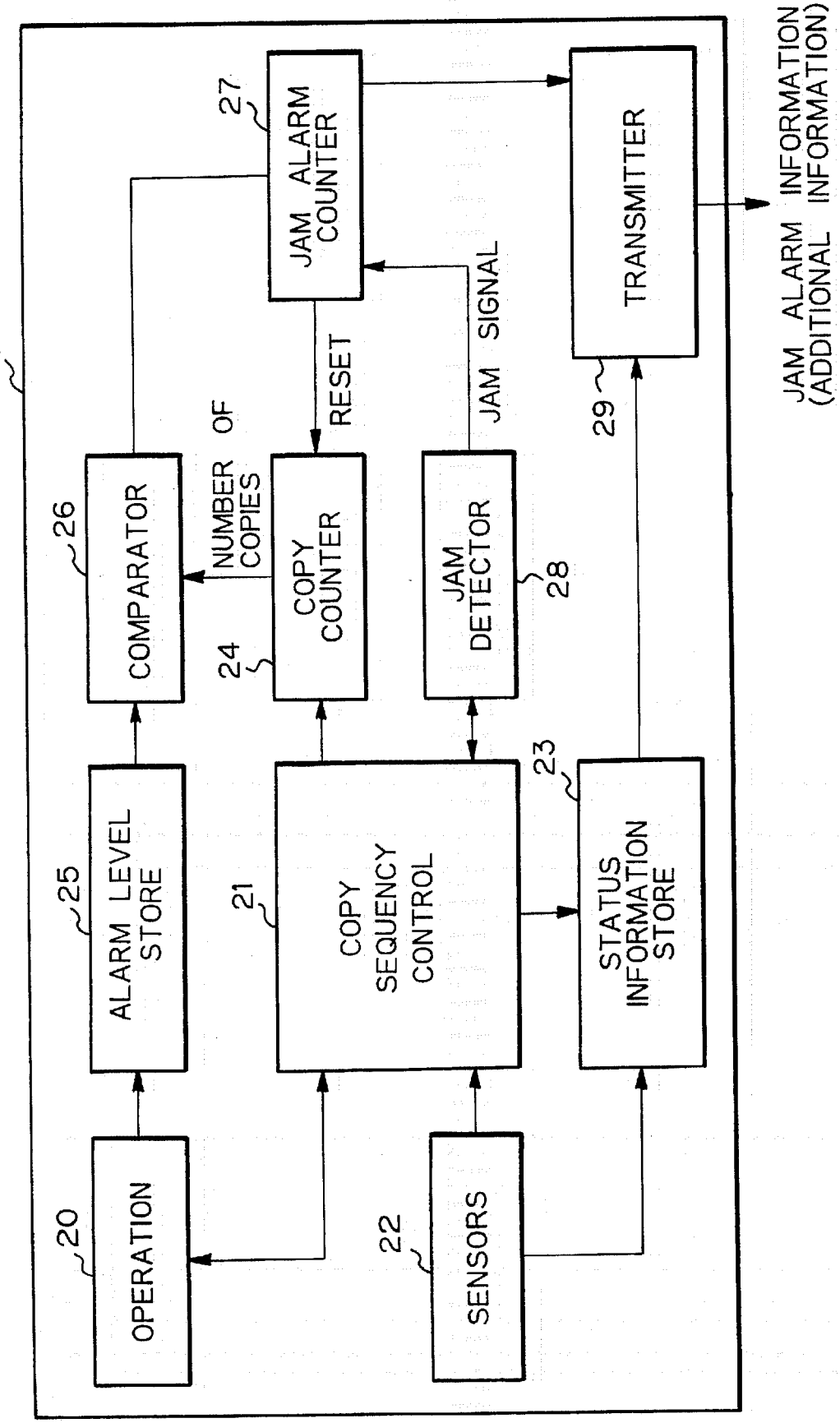
FIG. 3 is a block diagram schematically showing a specific construction of the copier.
Figure 4:
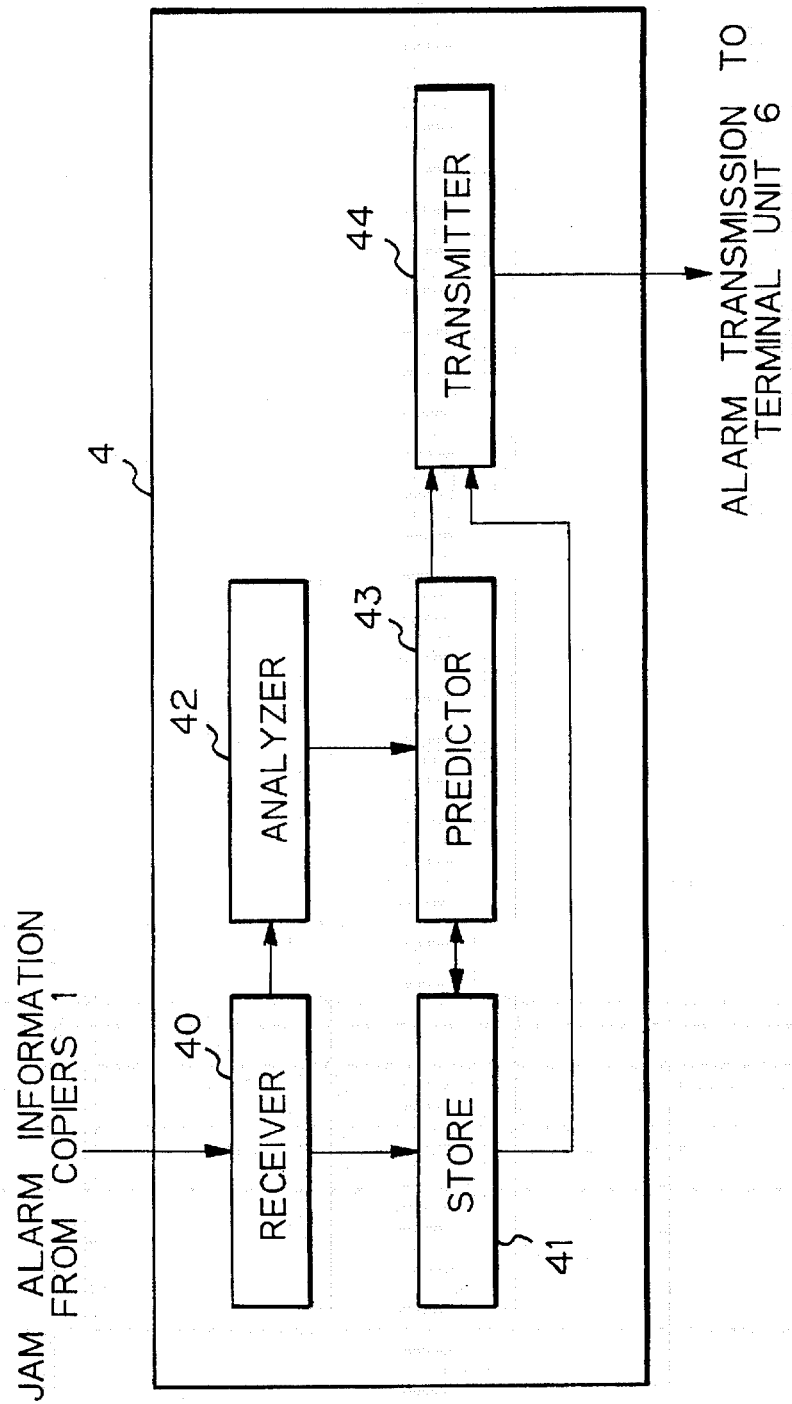
FIG. 4 is a block diagram schematically showing a specific construction of a control unit shown in FIG. 1.
Figure 5:
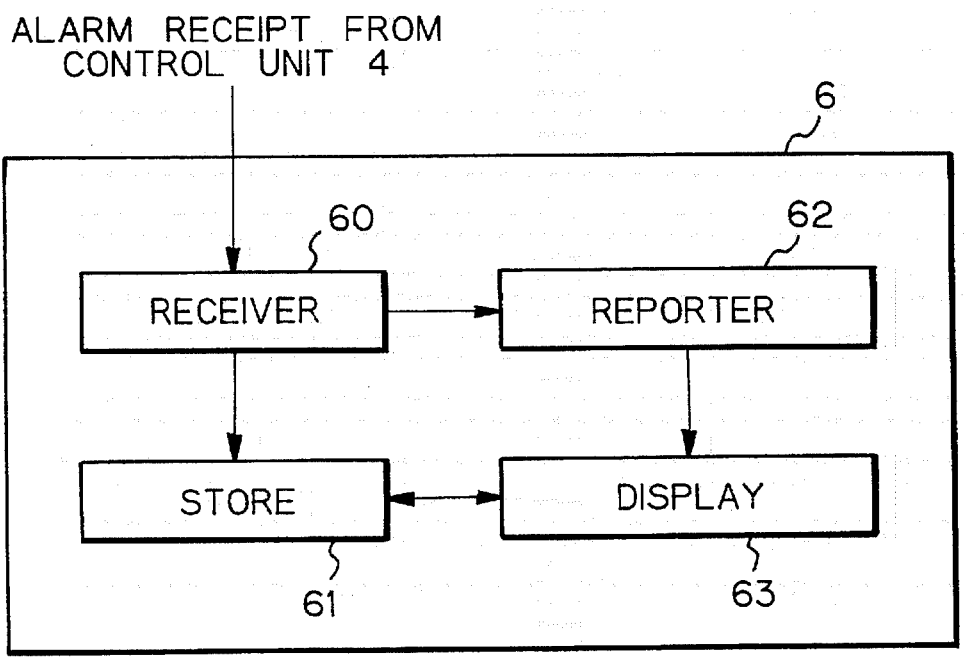
FIG. 5 is a block diagram schematically showing a specific construction of a terminal unit also shown in FIG. 1.

FIGS. 3, 4 and 5 respectively show the arrangements of the copier 1, control unit 4 and terminal unit 6 which are relevant to the present invention. The operations of the copier 1, control unit 4 and terminal unit 6 will be described with occasional reference to FIG. 6 and successive figures.

As shown in FIG. 3, the copier 1 has an operation mechanism 20 provided on the operation and display panel and including a start key, numeral keys and other conventional keys (switches), and indicators for displaying various conditions. A copy sequence control 21 controls the copy sequence of the copier 1 with a microcomputer. Assume that the start key included in the operation 20 is pressed. Then, the control 21 sequentially controls the various sections shown in FIG. 2, and the scanner, exposing device, motors, clutches, high-tension power sources and so forth which are not shown in FIG. 2, control a procedure for reproducing a document image on a paper. At the same time, the control 21 collectively controls the entire copier 1. Sensors 22 include the paper sensors A and F–I, FIG. 2, as well as sensors responsive to temperature (and humidity) inside the copier 1, fixing temperature, drum surface temperature, presence/absence of supplies, etc. A status information device 23 is a memory for storing status information relating to the copier 1 and represented by the output signals of the control 21 and sensors 22. The status information is additional information to be sent together with an alarm signal which will be described. For example, the count of a total counter (TC) for counting the cumulative number of copies, conveying time of the pick-up roller, fixing temperature and image density are included in the status information.

The sequence control 21 delivers a count signal to a copy counter 24 every time a copy is produced. The copy counter 24 counts copies on the basis of the count signals received from the control 21. An alarm level store 25 storage device an alarm level input from the operation 20. The alarm level is representative of the number of copies produced without a jam and necessary for a jam alarm count to be decremented. The storage device 25 is implemented by a non-volatile memory in order to prevent the alarm level from being deleted in the event of power down. A comparator 26 compares a count received from the counter 24 and an alarm level received from the storage device 25. When the number of copies reaches the alarm level, the comparator 26 feeds the result of comparison to a jam alarm counter 27.

When the jam alarm counter 27 receives a jam signal from a jam detector 28, it increments the jam alarm count. If the jam alarm count is not "0" when the counter 27 receives the result of comparison from the comparator 26, the counter 27 decrements it. When the jam alarm count reaches a predetermined value, e.g., "10", the counter 27 delivers jam alarm information to a transmitter 29 and, at the same time, sends a reset signal to the copy counter 24 for thereby resetting it. The counter 27 should preferably count not only such jam alarms but also jams occurring at the individual location in the copier 1. For example, the counter 27 may count jams sensed by the sensors A and F–I, FIG. 2, as A jams, F jams, G jams, H jams and I jams, respectively. Then, when the above jam alarm count reaches "10", the counter 27 will output, e.g, A jams "5", F jams "0", G jams "2", H jams "1" and I jams "2" as jam alarm information.

The transmitter 29 sends the jam alarm information received from the counter 27 to the control unit 4 via the data communication unit 2 and line 3, FIG. 1, together with the previously mentioned status information stored in the store 23 and an ID (identification) assigned to the copier 1.

The jam detector 28 monitors the output signals of the sensors A and F–I, FIG. 2, which are representative of paper transport times during the course of a copying operation as executed by the copy sequence control 21. For example, when the sensor located at the downstream side does not sense a paper in a preselected period of time after the sensor located at the upstream side has sensed it, or when the same sensor continuously senses a paper for more than a preselected period of time, the jam detector 28 determines that a jam has occurred, and then sends a jam signal particular to the location in trouble to the jam alarm counter 27. The jam signal is also used to interrupt the copying operation under way, and to display the jam and the location where it occurred on the operation 20. Usually, the operator of the copier 1 watching the display can remove the jamming sheet and thereby restore the copier to its normal condition.

Figure 6A:
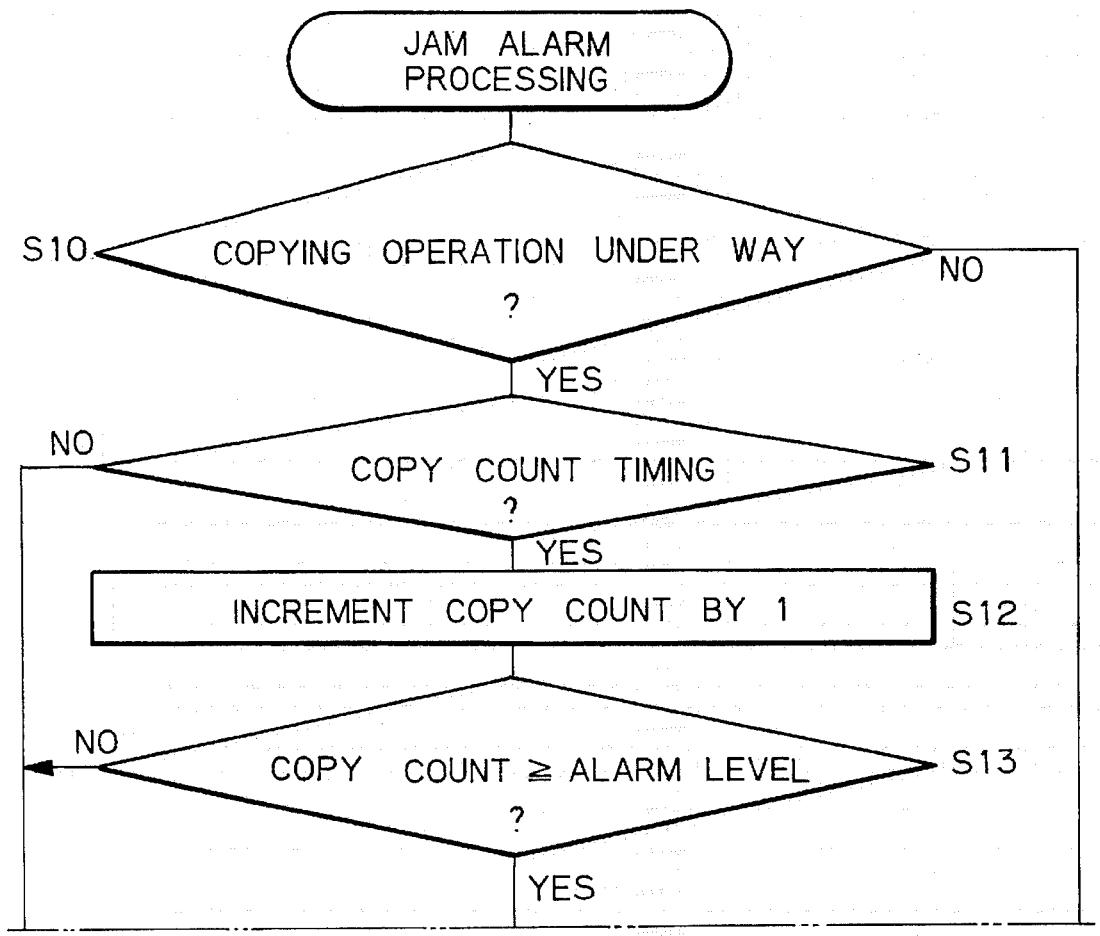
FIG. 6 is a flowchart demonstrating a routine to be executed by the copier of FIG. 1 and relating to jam alarm processing.
Figure 6B:
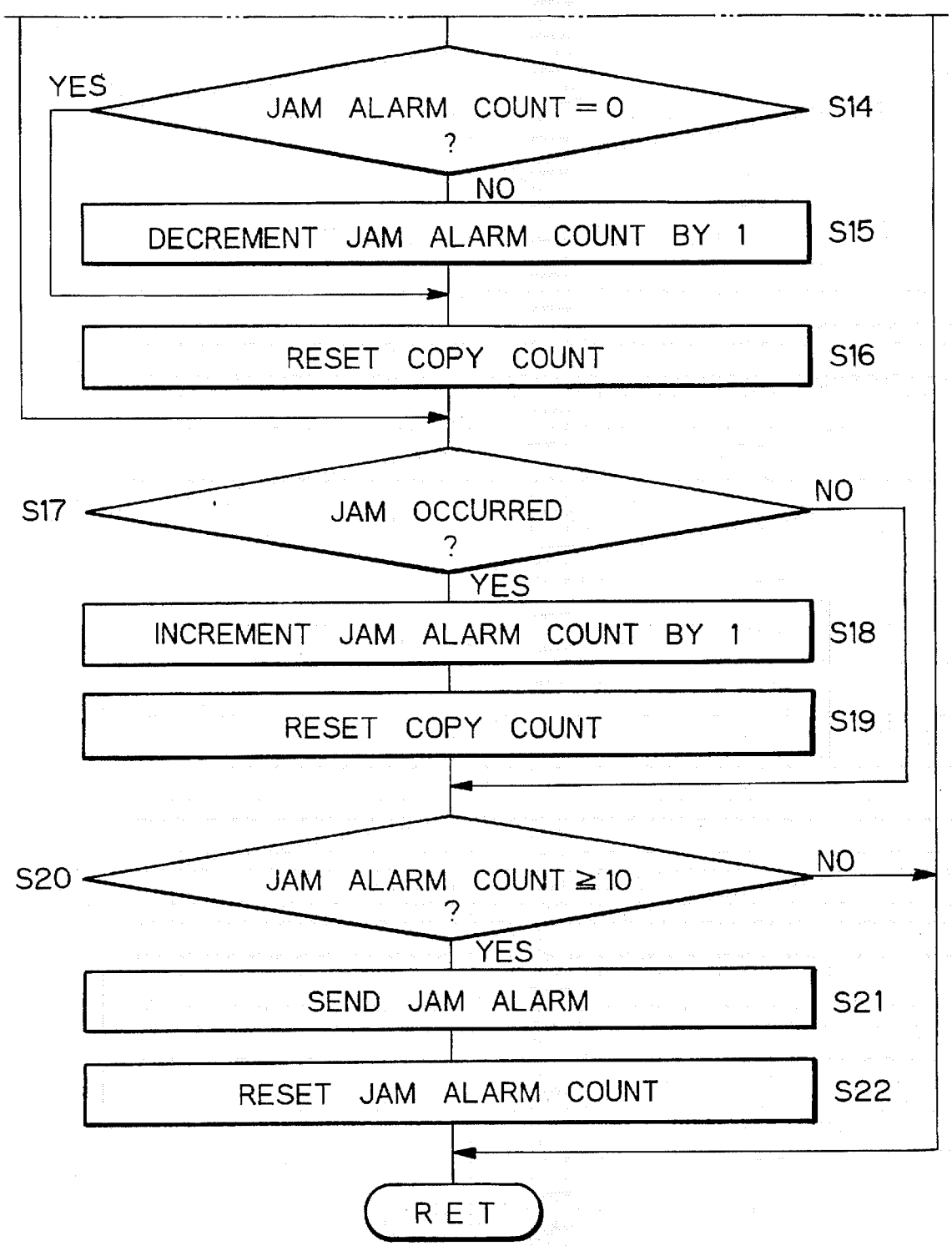

Reference will be made to FIG. 6 for describing jam alarm processing to be executed by the various sections of the copier 1. First, whether or not a copying operation is under way is determined (step S10). Only if a copying operation is under way, the routine to be described is effected; otherwise, the program simply returns to a main routine, not shown. If the answer of the above decision is positive (Y, step S10), whether or not the time for counting copies has been reached S10), is determined (step S11). If the answer of the step S11 is Y, the number of copies is incremented by 1 (one) (step S12). If the answer of the step S11 is negative (N), the operation is transferred to a step S17. The step S12 is followed by a step S13 for comparing the copy count with the alarm level. If the copy count is greater than or equal to the alarm level, e.g., 2,500 copies (Y, step S13), a step S14 is executed; if otherwise, the step S17 is executed.

In the step S14, whether or not the jam alarm count is "0" is determined. If the answer to step S14 is Y, a step S16 is executed; otherwise, the jam alarm count is decremented by 1, and then the step S16 is executed. In the step S16, the copy count is reset. Subsequently, whether or not a jam has occurred is determined (step S17). If the answer of the step S17 is Y, the jam alarm is incremented by 1 (step S18), and then the copy count is reset (step S19). This is followed by a step S20. If the answer to the step S17 is N, the step S18 is directly followed by the step S20. In the case of a jam, the location where it occurred is determined, and a jam counter assigned thereto is also incremented by 1.

In the step S20, whether or not the jam alarm count has reached the preselected value ("10" in the embodiment) is determined. If the answer of the step S20 is Y, the jam alarm information is sent to the control unit 4 together with the additional information and copier ID. (step S21). Then, the jam alarm count is reset (step S22). If the answer of the step S20 is N, the routine simply ends.

FIG. 4 shows a specific construction of the control unit or host computer 4. As shown, the control unit 4 has a receiver 40 for receiving the jam alarm information and additional information from each copier 1, a storage device 41 for sequentially storing the received information on a copier ID basis, an analyzer for analyzing the jam alarm information, a predictor 43 for predicting whether or not a serviceman's visit is necessary, and a transmitter 44. Every time the receiver 40 receives jam alarm information, the analyzer 42 analyzes the jam alarm information written to the storage device 41 and including the information particular to the copier 1, and performs remote diagnosis, e.g., error prediction. The predictor 42 predicts whether or not a serviceman's visit is necessary on the basis of the output of the analyzer 42. If the answer to this decision is positive, the predictor 43 sends to the transmitter 44 serviceman request information and, among the information storage device in the store 41, information necessary for a service. The transmitter 44 sends such information to one of the service stations 6, FIG. 1, in charge of the faulty copier 1.

FIG. 5 shows a specific construction of the service station or terminal unit 6. As shown, the terminal unit 6 has a receiver 60 for receiving the serviceman request information and information necessary for a service, a storage device 61 for storing the received information, a reporter 62 for reporting the serviceman request received by the receiver 60 to the operator, and a display 63 for displaying the received information (jam alarm information).

Figure 7B:
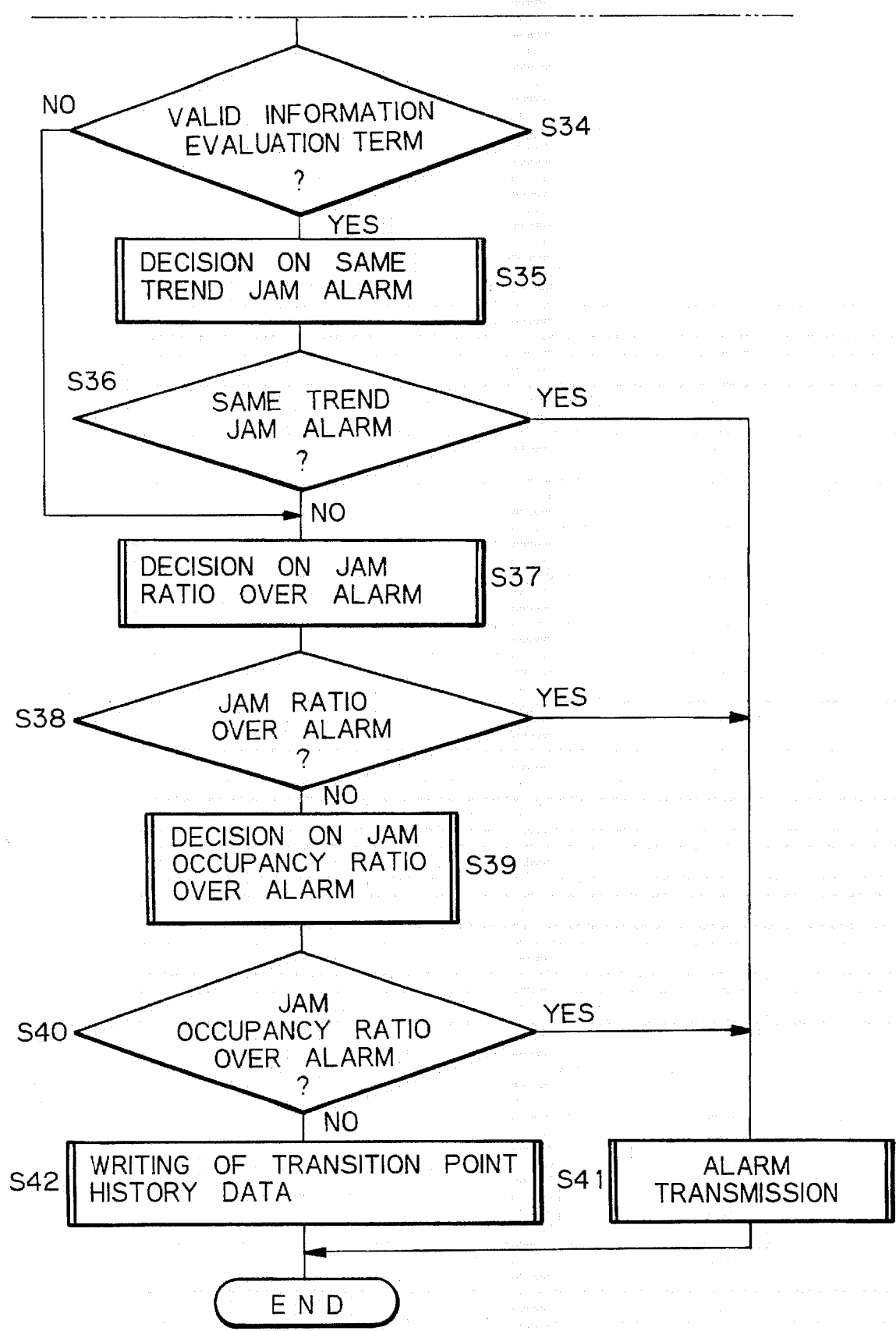
FIG. 7 is a flowchart demonstrating a main routine to be executed by the control unit or host computer of FIG. 4 and relating to the analysis of jam alarm information and the prediction of the need for a serviceman's visit.

How the control unit or host computer 4 analyzes the jam alarm information and predicts whether or not a serviceman's visit is necessary will be described with reference to FIG. 7 and successive figures. FIG. 7 shows a main routine to be executed by the computer 4. As shown, when the receiver 40 receives the jam alarm information (Y, step S30), the copier ID included in the information is identified, and then the information is cumulatively written to the storage device 41 (step S31). Subsequently, the analyzer 42 compares the newly received jam alarm information with the jam alarm information stored in the storage device 41 and particular to the copier 1, thereby executing the calculation, preparation and registration of transition point history data (step S32). This will be described in detail later. After the step S32, the predictor 43 makes a decision on a valid information evaluation term (step S33) to see if this time lies in a valid information evaluation term (step S34). If the answer to the step S34 is Y, the predictor 43 makes a decision on a same trend jam alarm (first prediction relating to the need for a serviceman's visit) (step S35). If the jam alarm is of the same trend (needing a serviceman's visit) (Y, step S36), the transmitter 44 sends the serviceman request and necessary information to the terminal unit 6 in charge of the copier 1 (step S41).

If the answer of the step S34 is N or if the answer of the step S36 is N, the predictor 43 makes a decision on a jam ratio over alarm (second prediction relating to the need for a serviceman's visit) (steps S37 and S38). If the answer of the step S38 is Y, meaning that a serviceman's visit is necessary, the transmitter 44 sends an alarm to the terminal unit 6 in charge of the copier 1. If the answer of the step S38 is N, the predictor 43 makes a decision on a jam occupancy over alarm (third prediction relating to the need for a serviceman's visit) (steps S39 and S40). If the answer of the step S40 is Y, meaning that a serviceman's visit is necessary, the transmitter 44 sends an alarm to the above terminal unit 6 (step S41). If the answer of the step S42 is N, the predictor 43 writes the transition point history data in the storage device 41 (step S42). Then, the main routine shown in FIG. 7 ends. The decisions mentioned above will also be described in detail later.

jams occurring in a day (jams per day) (step S57), prepares a transition point history table (step S58), and registers the history data (step S59).

Table 1 shown below lists specific jam alarm information written to the storage device 41 of the control unit 4. As shown, the jam alarm information are the cumulative values of the total counter (TC), A jams, F jams, G jams, H jams and I jams stored together with the dates of receipt of the jam alarm information. The dates are implemented by a timepiece function included in the control unit 4. Table 2 also shown below lists transition point history data derived from the information of Table 1 and generated by the analyzer 42.

TABLE 1

| Date | TC | A Jam | F Jam | G Jam | H Jam | I Jam |
| --- | --- | --- | --- | --- | --- | --- |
| Date 1 | TC1 | 1 time | 2 times | 3 times | 1 times | 3 times |
| Date 2 | TC2 | 2 times | 4 times | 6 times | 3 times | 7 times |
| Date 3 | TC3 | 4 times | 5 times | 7 times | 3 times | 11 times |
| . | . | . | . | . | . | . |
| . | . | . | . | . | . | . |
| Date N | TCN | times | times | times | times | times |

TABLE 2

| Number of Days of Operation | Term Copy Count | AXi | FXi | GXi | HXi | IXi | ΣXi | JAMCBF | Jams/Day |
| --- | --- | --- | --- | --- | --- | --- | --- | --- | --- |
| 16 | 3800 | 1 | 2 | 3 | 2 | 4 | 11 | 345 | 0.69 |
| 20 | 4600 | 2 | 1 | 1 | 0 | 5 | 10 | 460 | 0.5 |
| . | . | . | . | . | . | . | . | . | . |
| . | . | . | . | . | . | . | . | . | . |
| 8 | 2150 | 6 | 2 | 1 | 0 | 1 | 10 | 215 | 1.25 |

Figure 8A:
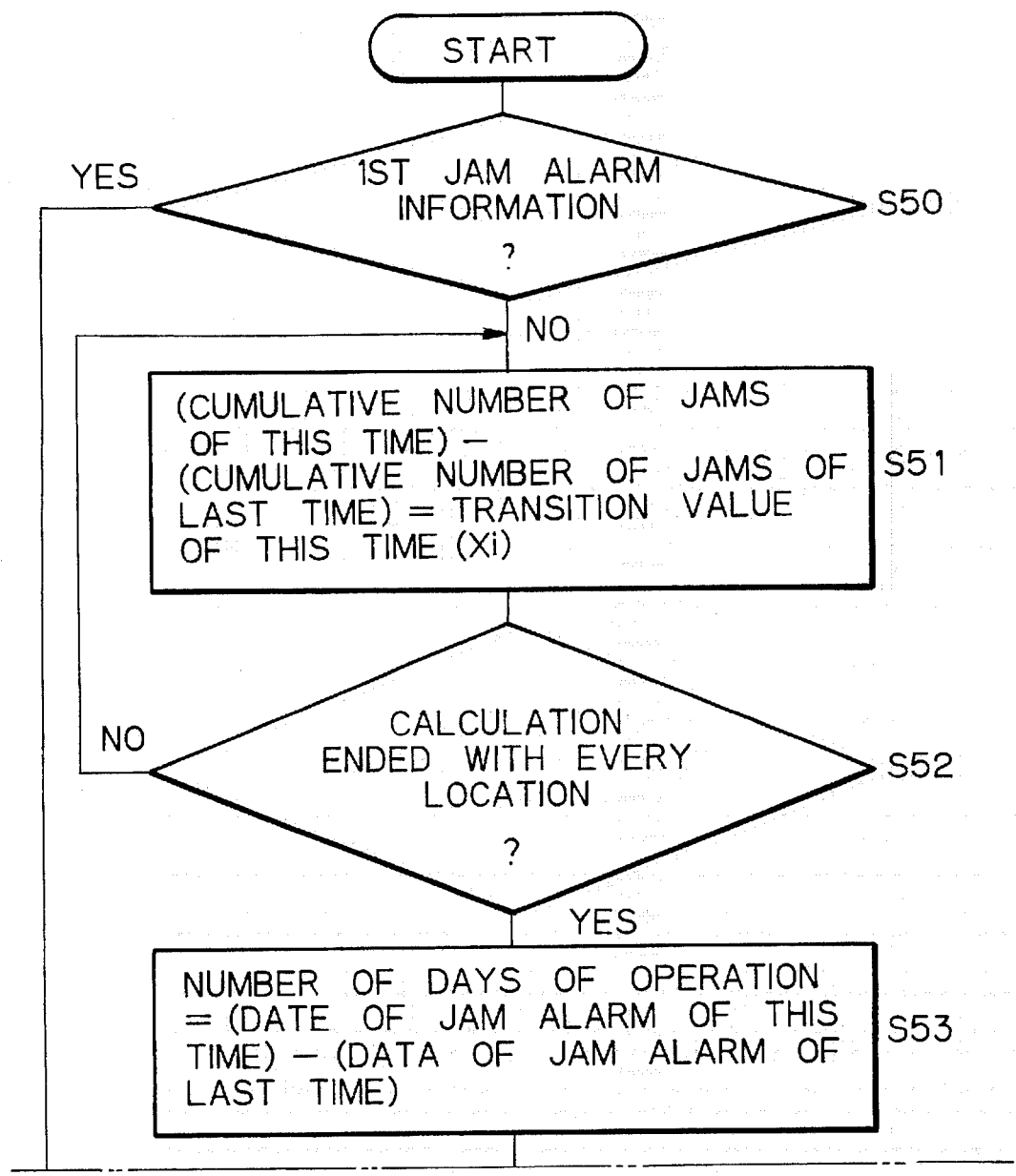
FIG. 8 is a flowchart representative of a routine included in FIG. 7 for the calculation, preparation and registration of transition point history data.
Figure 8B:
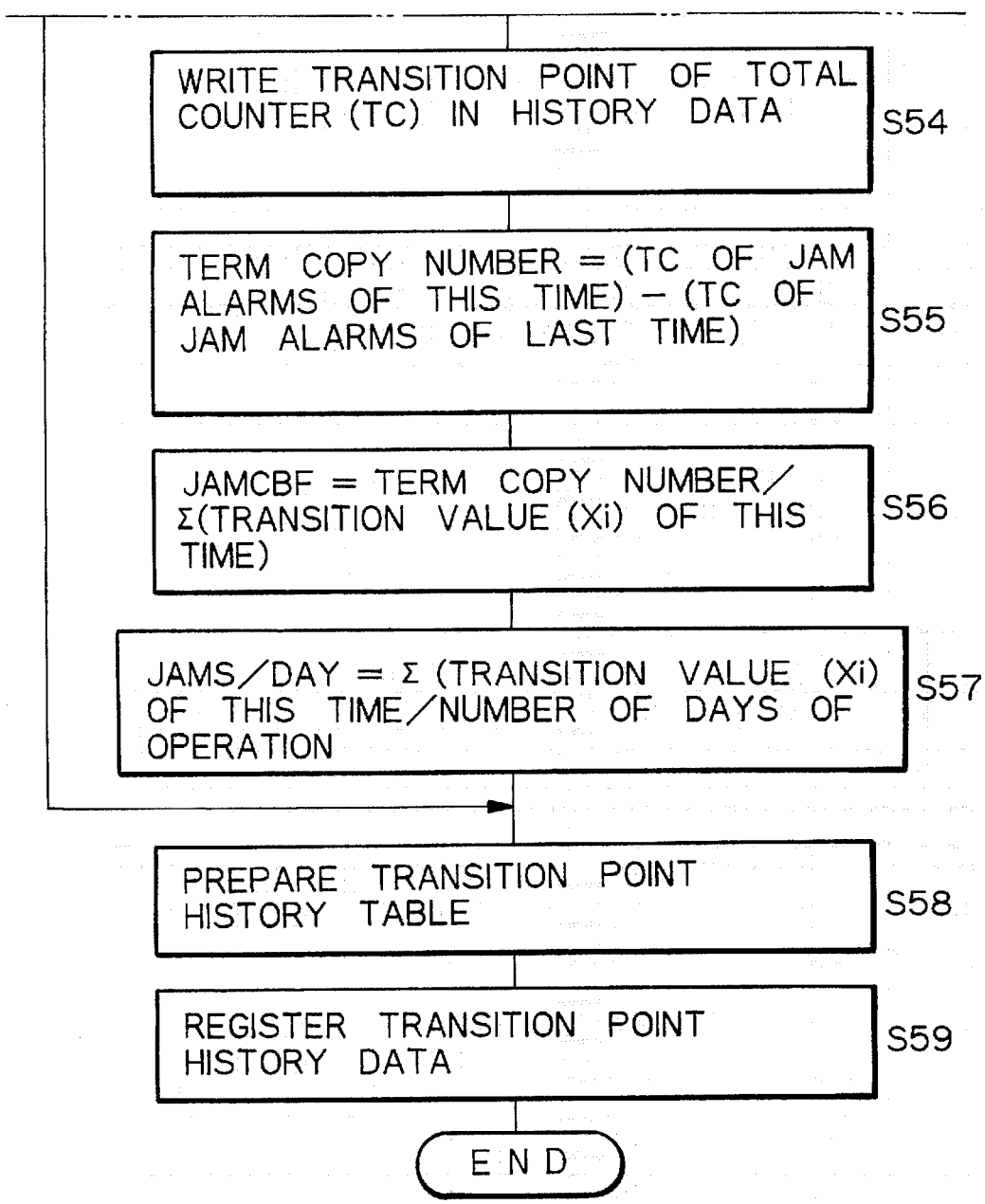

First, the calculation, preparation and registration of the transition point history data derived from the jam alarm information and executed by the analyzer 42 will be described with reference to FIG. 8. As shown, the analyzer 42 determines whether or not the jam alarm information is the first jam alarm information (step S50). If the answer of the step S50 is Y, the analyzer 42 prepares a transition point history table (step S58). If the answer of the step S50 is N, the analyzer 42 subtracts (cumulative numbers of jams of this time by locations) from (cumulative numbers of jams of last time by locations), i.e., calculates an increment from the last jam alarm information of the individual location (step S51). After repeating such a calculation with every location (Y, step S51), the analyzer 42 subtracts date of jam alarm of this time from date of jam alarm of last time in order to produce the number of days of operation (step S53). Then, the analyzer 42 writes the count of the total counter (TC) in the transition point history data (step S54).

Further, the analyzer 42 subtracts TC of jam alarms of this time from TC of jam alarms of last time in order to calculate the number of copies produced for a given term, i.e., term copy number (step S55). Then, the analyzer 42 divides the above term copy count by the sum (nearly equal to "10") of the transition values Xi of this time, thereby producing JAMCBF (jam ratio: the number of copies produced between consecutive jams) (step S56). Subsequently, the analyzer 42 divides the sum of the transition values Xi by the number of days of operation so as to produce the number of In Table 2, AXi, FXi, GXi, HXi and IXi are respectively representative of transition values between the A jams, F jams, G jams, H jams and I jams of this time and those of the last time, while ΣXi is representative of the sum of such transition values. The sum ΣXi often coincides with the preselected value ("10" in the specific case), but it exceeds the preselected value when the jam alarm count is subtracted.

The various decisions mentioned with reference to FIG. 7 and executed by the predictor 43 will be described in detail hereinafter.

Figure 9:
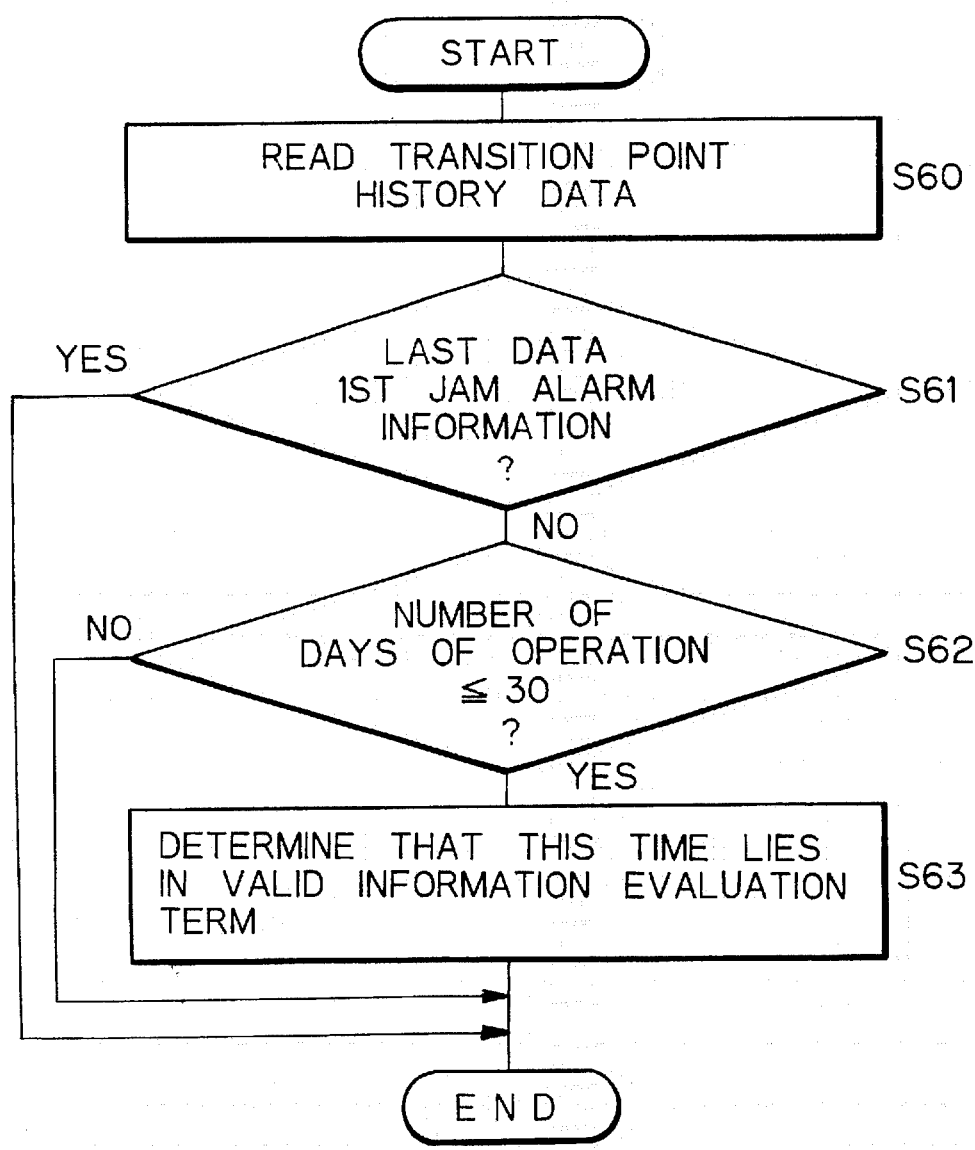
FIG. 9 is a flowchart representative of a routine also included in FIG. 7 for making a decision on a valid information evaluation term.

FIG. 9 shows the decision on the valid information evaluation term. As shown, the predictor 43 reads the transition history data, e.g., the data of Table 1 out of the analyzer 42 (step S60). If the last data is the first jam alarm information (Y, step S61), the predictor 43 ends the routine. If the answer of the step S61 is N, the predictor 43 determines whether or not the number of days of operation is less than or equal to "30" (step S62). If the answer of the step S62 is N, the predictor 43 ends the routine; otherwise, it determines that this time lies in a valid information evaluation term (step S63). Of course, any desired number of days other than thirty may be selected in matching relation to the user's characteristic, e.g., the user strict on errors or the user needing priority administration.

Figure 10A:
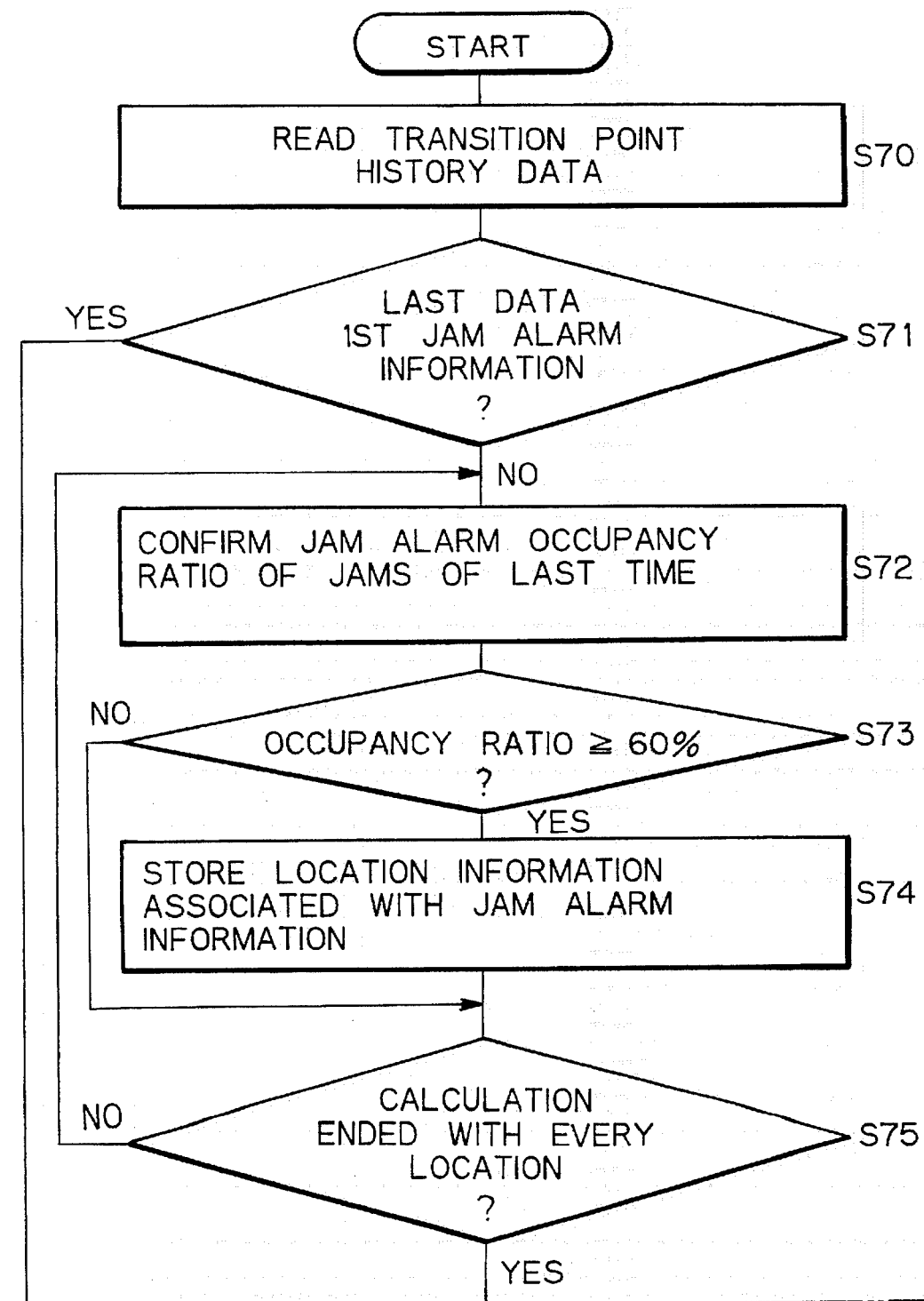
FIG. 10 is a flowchart representative of a routine also included in FIG. 7 for making a decision on a same trend jam alarm.
Figure 10B:
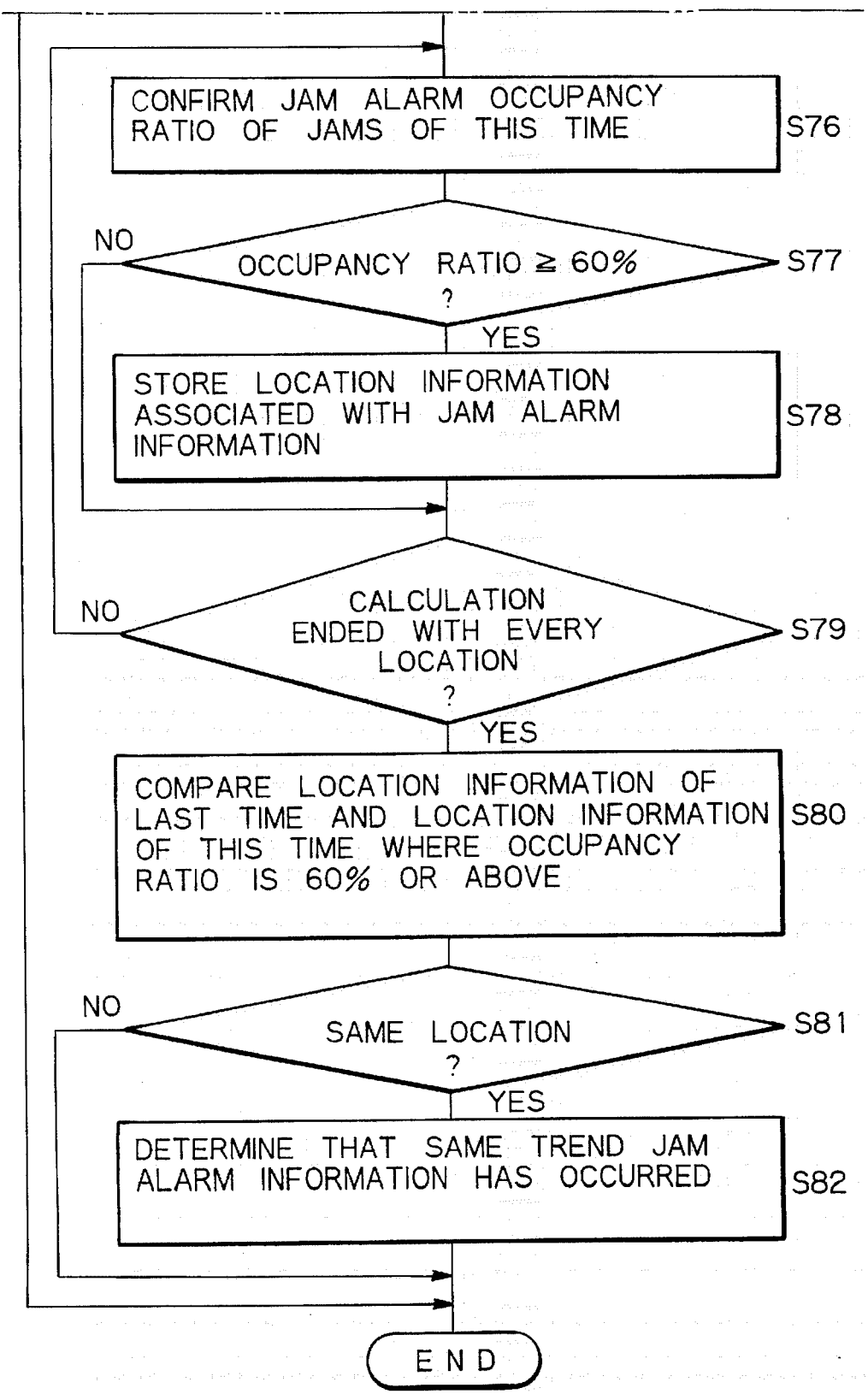

FIG. 10 shows the decision on the same trend jam alarm or first prediction relating to the need for a serviceman's visit. First, the predictor 43 reads the transition point history data out of the analyzer 42 (step S70), and determines whether or not the last data is the first jam alarm information (step S71). If the answer of the step S71 is Y, the predictor 43 ends the routine; otherwise, it confirms the location-by-location jam alarm occupancy ratios of the last time, i.e., the ratios of the numbers of jams AXi–IXi of Table 2 to the sum $\Sigma Xi$ (step S72). If the jam alarm occupancy ratio of any location is greater than or equal to 60% (Y, step S77), the predictor 43 memorizes the location (step S73). After executing the above procedure with the A jam location to the I jam location (steps S74 and S75), the predictor 43 confirms the location-by-location jam alarm occupancy ratios of this time (step S76), and if any of them is greater than or equal to 60% (step S77), memorizes the location (step S78).

Figure 11:
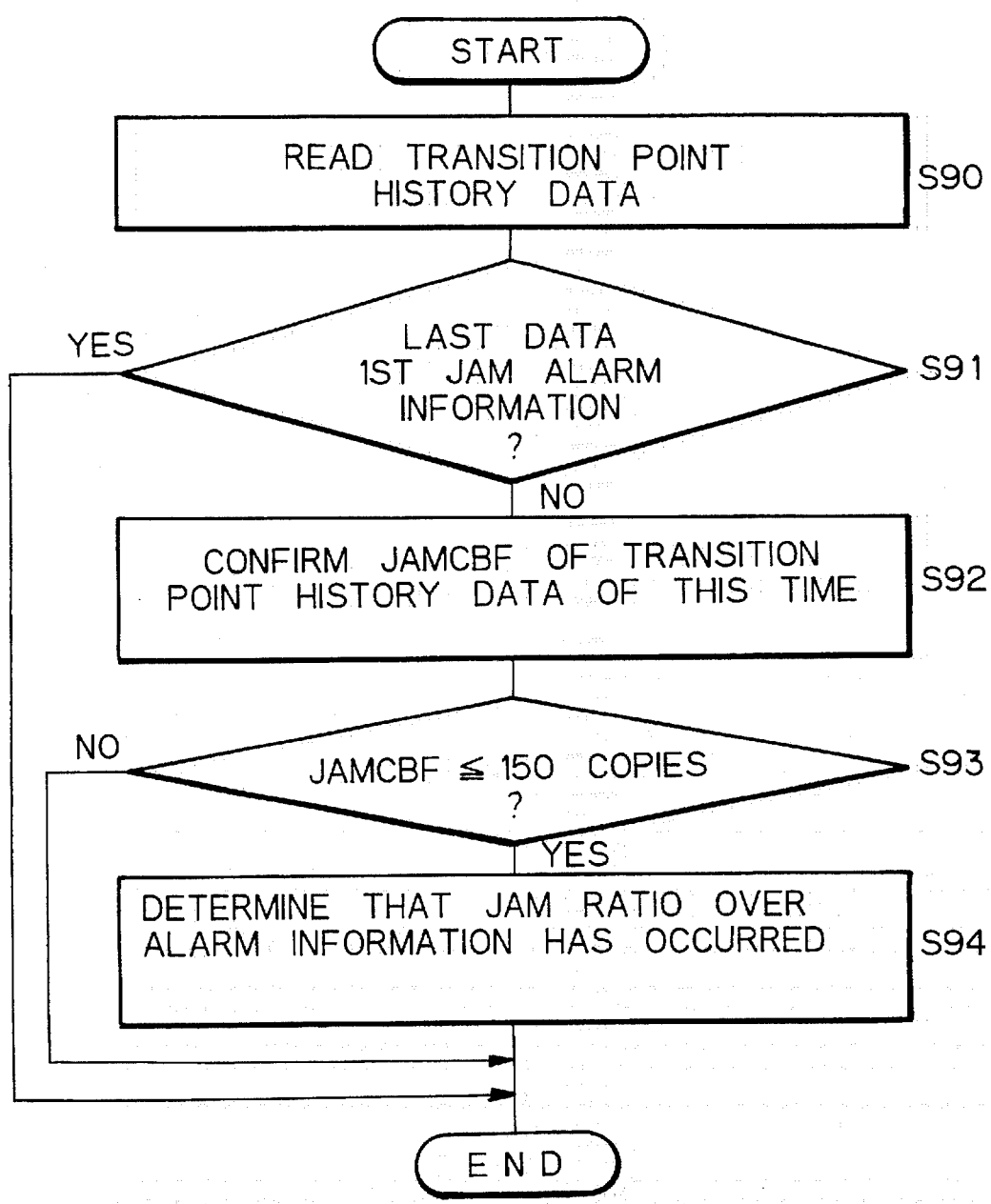
FIG. 11 is a flowchart representative of a routine further included in FIG. 7 for making a decision on a jam ratio over alarm.

On completing the above procedure with the A jam location to the I jam location (step S79), the predictor 43 compares information representative to location where the jam alarm occupancy ratio to the last time is greater than or equal to 60% and information representative of the location where the occupancy ratio of this time is greater than or equal to 60% (step S80), thereby determining whether or not a jam has occurred at the same location (step S81). If the answer of the step S81 is N, the predictor 43 ends the routine. If the answer of the step S81 is Y, the predictor 43 determines that jam alarm information of the same trend has occurred (needing a serviceman's visit) (step S82), and then ends the routine. Specifically, when jam alarm information representative of a jam occupancy ratio of greater than 60% and particular to a certain location is received twice within the valid information evaluation term (e.g. thirty days), the corresponding portion of the last data (transition point history data) is marked and then sent. Of course, any desired ratio other than 60% may be selected in matching relation to the user's characteristic, e.g., the user needing priority administration or the user suffered from many jams last month FIG. 11 shows the decision on the jam ratio over alarm or second prediction relating to the need for a serviceman's visit. First, the predictor 43 reads the transition point history data out of the analyzer 42 (step S90), and then determines whether or not the last data is the first jam alarm information (step S91). If the answer of the step S91 is Y, the predictor 43 simply ends the routine. If the answer of the step S91 is N, the predictor 43 confirms JAMCBF (jam ratio: term copy number/$\Sigma Xi$) (step S92). If JAMCBF is smaller than or equal to a preselected value ("150" in this case) (Y, step S93), the predictor 43 determines that jam ratio over alarm information has occurred (needing a serviceman's visit) (step S94), and then ends the routine. Specifically, when the jam ratio JAMCBF included in the data of Table 2 falls below the preselected value (150), the transition point history data of that instant is sent as jam ratio over alarm information. Again, any desired value other than 150 may be selected in matching relation to the user's characteristic, e.g., the user needing priority administration or the user suffered from many jams last month. In addition, the reciprocal of JAMCBF may be used as the jam ratio.

Figure 12:
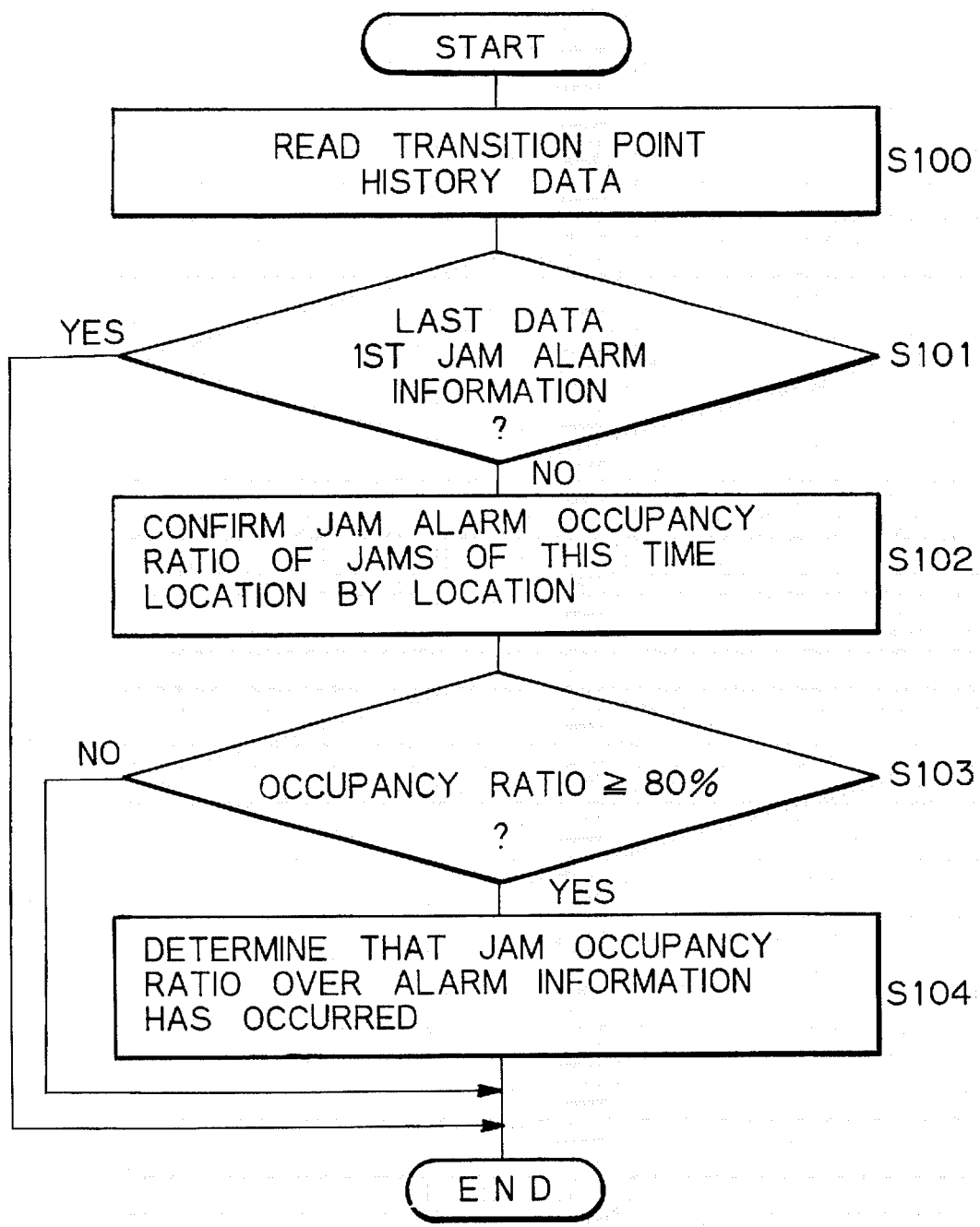
FIG. 12 is a flowchart representative of a routine additionally included in FIG. 7 for making a decision on a jam occupancy ratio over alarm.

FIG. 12 shows the decision on the jam occupancy ratio over alarm or third prediction as to the need for a serviceman's visit. First, the predictor 43 reads the transition point history data out of the analyzer 42 (step S100), and determines whether or not the last data is the first jam alarm information (step S101). If the answer of the step S101 is Y, the predictor 43 ends the routine. If the answer of the step S101 is N, the predictor 43 confirms the jam alarm occupancy ratio of this time location by location (step S102). If the occupancy ratio of any location is greater than or equal to 80% (Y, step S103), the predictor 43 determines that jam occupancy ratio over alarm information (needing a serviceman's visit) has occurred (step S104), and then ends the routine. Specifically, even if a serviceman's visit is not necessary, as determined in any one of the above steps, the predictor 43 determines, when the jam occupancy ratio of any location is greater than or equal to 80%, that a serviceman's visit is necessary; the transition point history data of that instant is sent. Of course, the any desired ratio other than 80% may be selected in matching relation to the user's characteristic, e.g., the user needing priority administration or the user suffered from many jams last time.

Figure 13A:
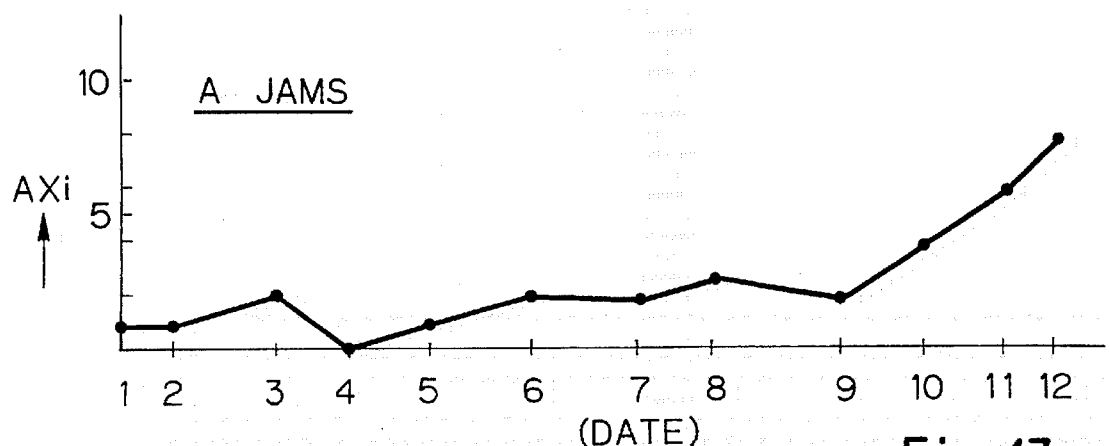
FIG. 13 is a graph showing location-by-location changes in the cumulative number of jams between consecutive jam alarm information, and plotted at times when the history data are registered.
Figure 13B:
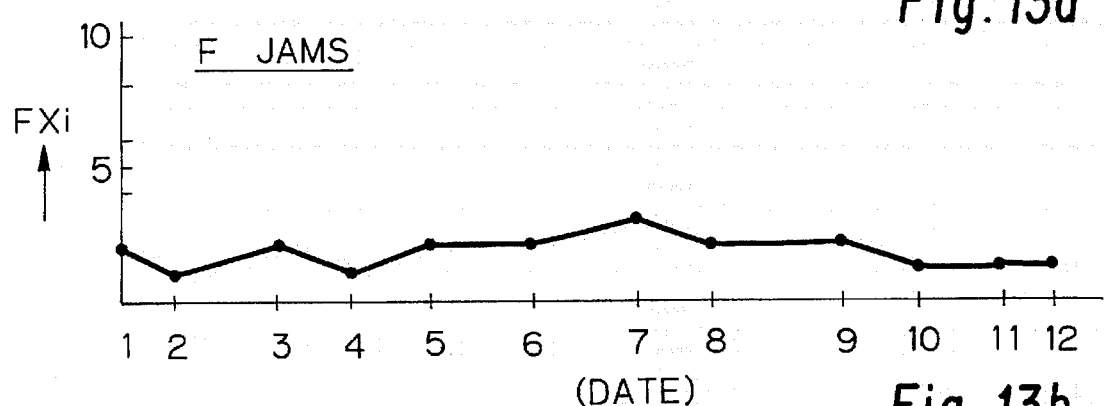
Figure 13C:
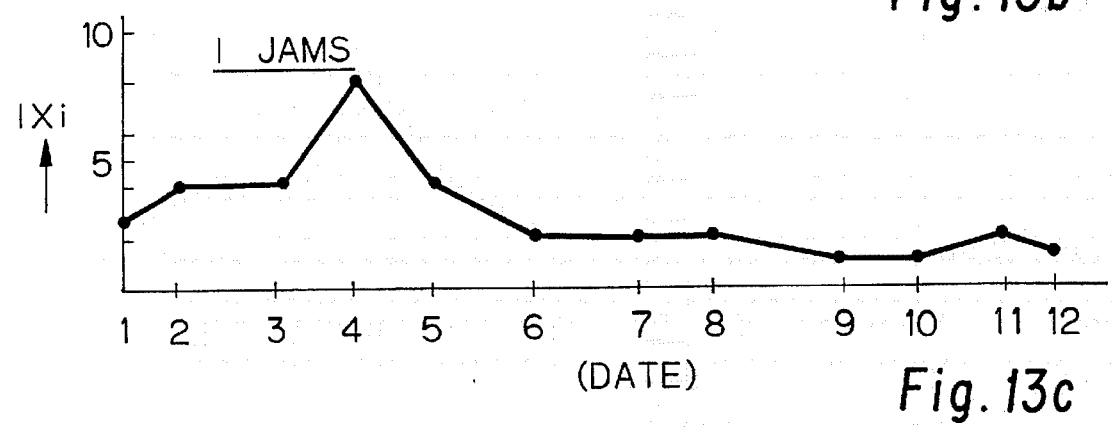

FIG. 13 shows, taking the A jams, F jams and I jams as an example, the transition values (Xi) of the cumulative numbers of jams between consecutive jam alarm information, and plotted at the times when the data listed in Table 2 are registered. The curves of FIG. 13 each indicates the trend between the consecutive times. By using the trend, it is possible to predict the need for a serviceman's visit (an error occurs) or the location where an error occurs, when the trend agrees with a particular pattern. For example, as to the A jams, the trend toward higher frequency is still continuing, and the same trend has occurred a plurality of consecutive times. Hence, it is possible to determine that a cause of jam exists in the sheet feed section, and that a serviceman's visit is needed. As to the I jams, although the frequency has increased for a while, it is now decreased; it is possible to determine that a serviceman's visit is not necessary although a cause of jam exists in the paper discharge section. For the prediction of an error and the prediction of the need for a serviceman's visit, any desired criterion other than the above pattern may be used. For example, when the number of jams that occur in a day, shown in Table 2, exceeds 1.0, it may be predicted that a serviceman's visit is necessary.

Figure 14:
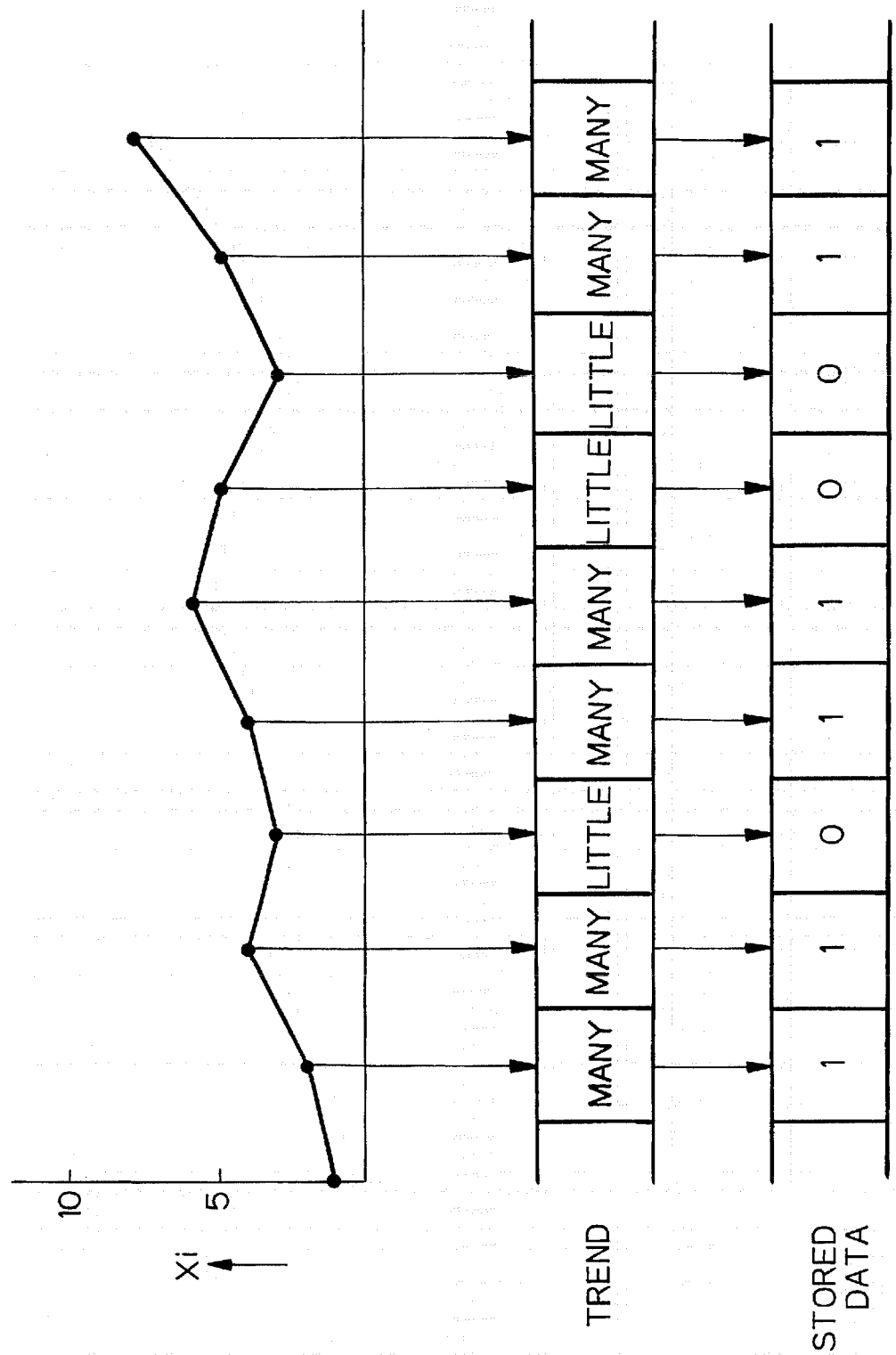
FIG. 14 demonstrates the storage of jam alarm information and representative of an alternative embodiment of the present invention.

FIG. 14 shows the storage of the jam alarm information and representative of an alternative embodiment of the present invention. As shown, in this embodiment, the cumulative numbers of jams classified by location are not written to the storage device 41, FIG. 4, of the control unit 4, but only the numbers of jams represented by the jam alarm information of the last time. The analyzer 42 compares the location-by-location numbers of jams of this time with the above information stored in the store 41, and stores only binary data representative of trend values, i.e., whether or not the number of this time is greater than the number of the last time (ONE if the former is greater than the latter or ZERO if otherwise). When ONE continuously appears more than a predetermined time, it may be determined that a serviceman's visit is necessary. This successfully saves the memory capacity required of the control unit 4 to a noticeable degree.

The retroactive range of the valid information evaluation term to be used by the analyzer 42 and predictor 43 of the control unit or host computer 4, and the preselected values for the various decisions may be input on a numerical input section included in the host computer 4, as desired. Specifically, the operator of the host computer 4 may select a range setting picture or a reference value setting picture on the computer 4, and then manipulate numeral keys arranged on an operating section.

While the embodiments have concentrated on a paper jam, the present invention is practicable with any other event indicative of or predictive of an error, e.g., one relating to a fixing temperature or a charge voltage. In addition, the present invention is applicable not only to copiers but also to facsimile apparatuses, printers and other image forming apparatuses.

In summary, it will be seen that the present invention provides a remote service system for image forming apparatuses and having various unprecedented advantages, as enumerated below.

(1) The system has a single control unit capable of automatically collecting service information from the apparatuses distributed over a broad range including numerous service stations, automatically effecting accurate remote diagnosis including the prediction of an error and the prediction as to whether or not a serviceman's visit is necessary, and automatically sending, e.g., a serviceman request to a necessary service station or terminal unit. Hence, the system allows a rapid and adequate measure to be taken before a critical error occurs.

(2) The range of information to be analyzed by the control unit can be adequately selected in matching relation to the user's characteristic and other conditions. This promotes rapid diagnosis and prediction.

(3) The control unit may not cumulatively store phenomena indicative of or predictive of errors received from each apparatus, but it may sequentially store only the trend of occurrence of errors. Then, a memory capacity required of the control unit can be noticeably reduced.

Various modifications will become possible for those skilled in the art after receiving the teachings of the present disclosure without departing from the scope thereof.

What is claimed is:

1. A control unit in an image forming apparatus service system comprising:
a first communications line configured to connect on one end to a plurality of image forming apparatuses, each of said plurality of image forming apparatuses configured to provide information regarding respective detected errors and predicted future errors which occur therein;
a second communications line connected on one end to plural service stations assigned to respective subsets of said plurality of image forming apparatuses, said second communications line configured to deliver to at least one of said plural service stations a maintenance message indicative of which of said plural image forming apparatuses requires servicing;
storing means, coupled to another end of said first communications line, for sequentially storing the information from said plurality of image forming apparatuses;
analyzing means for analyzing the information stored in the storing means and for producing an analysis result;
predicting means for predicting one of the predicted future errors and detecting one of the detected errors based on said analysis result, and for determining whether to dispatch a serviceperson to repair the predicted future error and the detected error; and
transmitting means, coupled to another end of the second communications line, for transmitting the maintenance message to the at least one of said plural service stations assigned to service a particular image forming apparatus of said plurality of image forming apparatuses that produced said information resulting in said predicting means either predicting the future error or detecting the detected error associated with said particular image forming apparatus.

2. The control unit of claim 1, wherein said analyzing means comprises setting means for setting alarm thresholds to specific threshold levels within a range of candidate threshold levels, said analyzing means using said alarm thresholds set by said setting means for producing said analysis result.

3. The control unit of claim 1, wherein:
said storage means comprises means for sequentially storing a data trend based on said information provided from said plurality of image forming apparatuses; and
said analyzing means for analyzing said data trend and for adjusting a frequency with which said analysis result indicates a presence of said detected error or said predicted error.

4. A service system comprising:
plural image forming apparatuses, each configured to produce information regarding a respective detected error or a predicted future error that occurs therein;
a first communications line coupled on one end to respective of said plural image forming apparatuses, said first communications line configured to transport information regarding said respective detected error or said predicted future error;
a control unit coupled to another end of said first communications line and configured to remotely monitor said plural image forming apparatuses by receiving via said first communications line said information, comprising,
storing means for sequentially storing the information from said plural image forming apparatuses,
a processor configured to analyze said information and determine an occurrence of the detected error or the predicted future error based on said information, said processor including,
an analysis mechanism configured to analyze the information stored in the storing means and produce an analysis result,
a determination mechanism configured to determine whether the determined error occurred based on said analysis result,
a prediction mechanism configured to predict an occurrence of the predicted future error based on said analysis result,
a transmit determining mechanism configured to determine whether to transmit a maintenance message requesting maintenance service for one of said plurality of image forming apparatuses in which said determining mechanism and prediction mechanism respectively identified an occurrence of the determined error or predicted future error, and
a transmission mechanism configured to transmit said maintenance message in accordance with said determining mechanism;
a second communications line connected on one end to said control unit and configured to transfer the maintenance message; and
a plurality of service stations connected to another end of second communications line and assigned to repair respective subsets of said plurality of image forming apparatuses, respective of said plurality of service stations responsive to said maintenance message transmitted from said control unit through said second communications line.

5. A control unit in an image forming apparatus service system comprising:
a first communications line configured to connect on one end to a plurality of image forming apparatuses, each of said plurality of image forming apparatuses configured to provide information regarding respective errors which occur therein;
a second communications line connected on one end to plural service stations assigned to respective subsets of said plurality of image forming apparatuses, said second communications line configured to deliver to at least one of said plural service stations a maintenance message indicative of which of said plural image forming apparatuses requires servicing;

a storage device, coupled to another end of said first communications line, for sequentially storing the information from said plurality of image forming apparatuses;

an analyzing mechanism configured to analyze the information stored in the storage device and for producing an analysis result;

a determination mechanism configured to determine whether errors indicated by a particular image forming apparatus of said plurality of image forming apparatuses have a tendency to increase based on said analysis result and for preparing the maintenance message to be sent to a terminal related to at least one of said plural service stations assigned to service the particular image forming apparatus when said errors are determined to have a tendency to increase;

a transmit device, coupled to another end of the second communications line, for transmitting the maintenance message to the at least one of said plural service stations.

6. The control unit according to claim 5, wherein said determination mechanism determines whether said errors in said particular image forming apparatus have a tendency to increase when said errors comprise paper jams.

7. The control unit according to claim 6, wherein said determination mechanism is configured to determine whether a rate of increase in said paper jams for a particular location in said particular image forming apparatus continues to exceed a predetermined threshold for a predetermined period of time or a predetermined number of image forming operations.

8. The control unit of claim 6, wherein said determination mechanism determines whether a rate of increase in said paper jams for a particular location in said particular image forming apparatus exceeds a predetermined threshold.

9. The control unit of claim 6, wherein said determination mechanism determines whether a rate of increase in said paper jams in said particular image forming apparatus continues to exceed a predetermined threshold for a period of time or a predetermined number of image forming operations.

10. The control unit as in claim 6, further comprising a delivery mechanism for delivering jam history data to said terminal.

11. The control unit as in claim 7, further comprising a delivery mechanism for delivering jam history data to said terminal.

12. The control unit as in claim 8, further comprising a delivery mechanism for delivering jam history data to said terminal.

13. The control unit as in claim 9, further comprising a delivery mechanism for delivering jam history data to said terminal.

14. A control unit in an image forming apparatus service system comprising:

a first communications line configured to connect on one end to a plurality of image forming apparatuses, each of said plurality of image forming apparatuses configured to provide information regarding respective errors which occur therein;

a second communications line connected on one end to plural service stations assigned to respective subsets of said plurality of image forming apparatuses, said second communications line configured to deliver to at least one of said plural service stations a maintenance message indicative of which of said plural image forming apparatuses requires servicing;

a storage device, coupled to another end of said first communications line, for sequentially storing the information from said plurality of image forming apparatuses;

an analyzing mechanism configured to analyze the information stored in the storage device and for producing an analysis result;

a determination mechanism configured to determine whether errors indicated by a particular image forming apparatus of said plurality of image forming apparatuses constitute an increased error rate based on a preselected number of images relative to a preselected value and said analysis result, and for preparing the maintenance message to be sent to the terminal related to at least one of said plural service stations assigned to service the particular image forming apparatus when the increased error rate is determined to have occured; and a transmit device, coupled to another end of the second communications line, for transmitting the maintenance message to the at least one of said plural service stations.

15. The control unit of claim 14, wherein said determination mechanism determines whether said errors in said particular image forming apparatus have the increased error rate when said errors comprise paper jams.

16. The control unit of claim 15, further comprising a delivery mechanism for delivering jam history data to a terminal related to said at least one of said plural service stations.

17. A method for controlling servicing information in an image forming apparatus service system, comprising the steps of:

connecting a first communications line on one end to a control unit and on the other end to a plurality of image forming apparatuses, each of said plurality of image forming apparatuses configured to provide information regarding respective errors which occur therein;

connecting a second communications line on one end to said control unit and on the other end to plural service stations assigned, to respective subsets of said plurality of image forming apparatuses, said second communications line configured to deliver to at least one of said plural service stations a maintenance message indicative of which of said plural image forming apparatuses requires servicing;

providing said information regarding respective errors from each of said plurality of image forming apparatuses to a storage device;

sequentially storing the information from said plurality of image forming apparatuses in said storage device;

analyzing the information stored in the storage device and producing an analysis result;

determining whether errors indicated by a particular image forming apparatus have a tendency to increase, and preparing the maintenance message for transmittal to a terminal related to at least one of said plural service stations assigned to service the particular image forming apparatus when said errors are determined to have a tendency to increase; and transmitting the maintenance message to the at least one of said plural service stations.

18. The method of claim 17, wherein said determining step comprises determining whether said errors in said particular image forming apparatus have a tendency to increase when said errors comprise paper jams.

19. The method according to claim 18, wherein said determining step comprises determining whether a rate of increase in said paper jams for a particular location in said particular image forming apparatus continues to exceed a predetermined threshold for a predetermined period of time or a predetermined number of image forming operations.

20. The method of claim 18, wherein said determining step comprises determining whether a rate of increase in said paper jams for a particular location in said particular image forming apparatus exceeds a predetermined threshold.

21. The method of claim 18, wherein said determining step comprises determining whether a rate of increase in said paper jams in said particular image forming apparatus continues to exceed a predetermined threshold for a period of time.

22. The method as in claim 18, further comprising the step of delivering jam history data to said terminal.

23. The method as in claim 19, further comprising the step of delivering jam history data to said terminal.

24. The method as in claim 20, further comprising the step of delivering jam history data to said terminal.

25. The method as in claim 21, further comprising the step of delivering jam history data to said terminal.

26. A method for controlling servicing information in an image forming apparatus service system, comprising the steps of:

connecting a first communications line on one end to a control unit and on the other end to a plurality of image forming apparatuses, each of said plurality of image forming apparatuses configured to provide information regarding respective errors which occur therein;

connecting a second communications line on one end to said control unit and on the other end of the second communications line to plural service stations assigned to respective subsets of said plurality of image forming apparatuses, said second communications line configured to deliver to at least one of said plural service stations a maintenance message indicative of which of said plural image forming apparatuses requires servicing;

providing said information regarding respective errors from each of said plurality of image forming apparatuses to a storage device;

sequentially storing the information from said plurality of image forming apparatuses in said storage device;

analyzing the information stored in the storage device and producing an analysis result;

determining whether an increased error rate based on a preselected number of images has exceeded a preselected value and preparing the maintenance message for transmittal to a terminal related to at least one of said plural service stations assigned to service the particular image forming apparatus when said error rate is determined to have exceeded said preselected value; and transmitting the maintenance message to the at least one of said plural service stations.

27. The method of claim 26, wherein said determining step comprises determining whether said errors in said particular image forming apparatus have a tendency to increase when said errors comprise paper jams.

28. The method of claim 27, further comprising the step of delivering jam history data to a terminal related to said at least one of said plural service stations.

* * * * *